US012747632B2

(12) United States Patent
Wang

(10) Patent No.: US 12,747,632 B2
(45) Date of Patent: Sep. 29, 2026

(54) WAND FOR A CORD DRIVEN BLIND ASSEMBLY

(71) Applicant: ROLLEASE ACMEDA, INC., Stamford, CT (US)

(72) Inventor: Joshua Rui Wang, Broadmeadows (AU)

(73) Assignee: ROLLEASE ACMEDA, INC., Stamford, CT (US)

( * ) Notice: Subject to any disclaimer, the term of this patent is extended or adjusted under 35 U.S.C. 154(b) by 172 days.

(21) Appl. No.: 18/623,804

(22) Filed: Apr. 1, 2024

(65) Prior Publication Data

US 2024/0328253 A1 Oct. 3, 2024

(30) Foreign Application Priority Data

Apr. 3, 2023 (AU) ................................ 2023900940

(51) Int. Cl.
*E06B 9/42* (2006.01)
*E06B 9/78* (2006.01)

(52) U.S. Cl.
CPC .................. *E06B 9/78* (2013.01); *E06B 9/42* (2013.01); *E06B 2009/785* (2013.01)

(58) Field of Classification Search
CPC ..... E06B 9/40; E06B 9/42; E06B 9/56; E06B 9/60; E06B 9/78; E06B 2009/785
See application file for complete search history.

(56) References Cited

U.S. PATENT DOCUMENTS 5,465,775 A * 11/1995 Biba ........................ E06B 9/306 74/502
5,513,687 A 5/1996 Tuzmen et al.
(Continued)

FOREIGN PATENT DOCUMENTS

EP 1739272 A2 1/2007
KR 20160004077 U 11/2016
(Continued)

OTHER PUBLICATIONS

International-Type Search Report issued from the Australian Patent Office for Australian Application No. 2023900940, mailed Jan. 25, 2024; 9 pages.

*Primary Examiner* — Johnnie A. Shablack
(74) *Attorney, Agent, or Firm* — HAYNES AND BOONE, LLP

(57) ABSTRACT

A wand for operating a cord driven roller blind assembly having a retractable screen. The wand includes a longitudinal operating stalk securable to an operating cord extendable from a clutch assembly of the roller blind assembly. The stalk is pulled downwardly a first predetermined distance to extend the retractable screen and a second predetermined distance to retract the screen. The wand further includes a sleeve assembly disposed within the stalk and including a connector for connecting the wand to the clutch assembly. The connector includes a flexible neck region to allow the wand to pivot relative to the clutch assembly from a substantially upright position. The sleeve assembly includes a passage therethrough configured for passage of the operating cord from the clutch assembly to the stalk. The sleeve assembly conceals the cord between the clutch assembly and the stalk when the stalk is pulled to operate the blind.

12 Claims, 4 Drawing Sheets

(56) References Cited

U.S. PATENT DOCUMENTS

| | | | | | |
|---|---|---|---|---|---|
| 5,890,529 | A * | 4/1999 | Haarer | E06B 9/78 | 192/48.92 |
| 6,516,860 | B1 * | 2/2003 | Weaver | E06B 9/30 | 160/168.1 R |
| 6,752,194 | B1 * | 6/2004 | Huang | E06B 9/307 | 160/176.1 R |
| 7,578,334 | B2 * | 8/2009 | Smith | E06B 9/42 | 160/84.05 |
| 7,665,507 | B2 * | 2/2010 | Naoki | E06B 9/78 | 160/170 |
| 8,186,413 | B2 * | 5/2012 | Fujita | E06B 9/34 | 160/319 |
| 8,191,605 | B2 * | 6/2012 | Kwak | E06B 9/42 | 160/319 |
| 8,739,852 | B2 * | 6/2014 | Anderson | E06B 9/326 | 160/173 R |
| 8,844,605 | B2 * | 9/2014 | Ng | E06B 9/78 | 192/81 C |
| 9,151,110 | B2 * | 10/2015 | Vestal | E06B 9/303 | |
| 9,284,774 | B2 * | 3/2016 | Yu | E06B 9/322 | |
| 9,482,050 | B2 * | 11/2016 | Strand | E06B 9/50 | |
| 10,072,458 | B2 * | 9/2018 | Mullet | E06B 9/368 | |
| 10,407,983 | B2 * | 9/2019 | Holt | E06B 9/90 | |
| 10,538,963 | B2 * | 1/2020 | Anthony | E06B 9/326 | |
| 11,136,821 | B2 * | 10/2021 | Smith | E06B 9/322 | |
| 11,859,447 | B2 * | 1/2024 | Brown, II | E06B 9/06 | |
| 11,866,994 | B2 * | 1/2024 | Francoeur | E06B 9/322 | |
| 12,129,713 | B2 * | 10/2024 | Kim | E06B 9/42 | |
| 12,139,966 | B2 * | 11/2024 | Huang | E06B 9/262 | |
| 12,215,544 | B2 * | 2/2025 | Kim | E06B 9/90 | |
| 12,320,196 | B2 * | 6/2025 | Wang | E06B 9/78 | |
| 12,428,907 | B1 * | 9/2025 | Lu | E06B 9/60 | |
| 12,473,780 | B2 * | 11/2025 | Huang | E06B 9/262 | |
| 2012/0048485 | A1 * | 3/2012 | Fu-Lai | E06B 9/322 | 160/331 |
| 2012/0090795 | A1 | 4/2012 | Kirby | | |
| 2014/0131502 | A1 * | 5/2014 | Zhu | E06B 9/42 | 242/385.4 |
| 2014/0216668 | A1 * | 8/2014 | Kim | E06B 9/42 | 160/322 |
| 2016/0281423 | A1 * | 9/2016 | Kao | E06B 9/42 | |
| 2019/0178030 | A1 * | 6/2019 | Brown, II | E06B 9/40 | |
| 2021/0222489 | A1 * | 7/2021 | Huang | F16D 11/14 | |
| 2023/0059350 | A1 * | 2/2023 | Lu | E06B 9/60 | |
| 2023/0313605 | A1 * | 10/2023 | Huang | E06B 9/262 | 160/84.01 |
| 2024/0110439 | A1 * | 4/2024 | Colson | E06B 9/32 | |
| 2024/0271485 | A1 * | 8/2024 | Guerra | E06B 9/326 | |
| 2025/0250851 | A1 * | 8/2025 | Chen | E06B 9/42 | |

FOREIGN PATENT DOCUMENTS

| | | | | |
|---|---|---|---|---|
| WO | 2018004437 A1 | | 1/2018 | |
| WO | 2020160651 A1 | | 8/2020 | |
| WO | WO-2024118354 A1 | * | 6/2024 | E06B 9/326 |

* cited by examiner

WAND FOR A CORD DRIVEN BLIND ASSEMBLY

CROSS-REFERENCE TO RELATED APPLICATION

This application claims priority to and the benefit of the filing data of Australian Provisional Patent Application No. 2023900940, titled "Wand for a cord driven blind assembly" and filed on Apr. 3, 2023, the entire disclosure of which is hereby incorporated herein by reference.

TECHNICAL FIELD

The present disclosure relates to a wand for a cord driven roller blind assembly. The wand may be used to operate the cord of the blind assembly.

BACKGROUND ART

Cord driven blind assemblies include a component that is rotatable to extend and retract a blind. Such assemblies typically have a drive mechanism that is rotatable about a spindle, and engages a wrapped around cord. The cord which hangs from the assembly is in some instances attached to a hanging wand to facilitate operation of the blind by a user. Operation of the wand by hand causes the cord to control the drive mechanism to rotate about the spindle. The wand may be pulled one or more times to extend the blind to the desired location, and slightly pulled to retract the blind.

A problem with a hanging wand is that the cord can be exposed during operation of the wand which presents a safety risk, particularly for children. For example, the cord may become entangled around the neck of a child and present a strangulation risk.

It would be desirable to provide a wand for a cord driven roller blind which has one or more improved features.

In this specification, unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

SUMMARY

In accordance with a first aspect of the present disclosure, there is provided a wand for operating a cord driven roller blind assembly having a retractable screen, the wand comprising: an operating stork extending along a longitudinal axis of the stork, the stork being securable to an operating cord of the roller blind assembly, the stalk being configured to be at least pulled by a user to operate the roller blind assembly to selectively extend and retract the retractable screen, and a sleeve assembly at least in part overlapping with the stalk, the sleeve assembly being configured to connect with the roller blind assembly, the sleeve assembly having a passage therethrough configured for passage of the cord from the roller blind assembly to the stalk, wherein the sleeve assembly conceals the cord between the roller blind assembly and the stalk when the stalk is pulled to operate the blind.

In some forms, the sleeve assembly may include a connector for connecting the wand to the roller blind assembly, the connector being configured to allow the wand to pivot relative to the roller blind assembly.

In some forms, the connector may include a flexible neck region to allow the wand to pivot relative to the roller blind assembly from a substantially upright position.

In some forms, the sleeve assembly may include a main body and the connector includes a socket at one end for receiving a proximal end of the main body, the socket having at least one internal clip for engaging with a corresponding at least one recess provided in the main body.

In some forms, the roller blind assembly can include a control mechanism at one end thereof, and the connector may include a flared portion configured to be mounted within a housing of the control mechanism.

In some forms, the passage for the cord preferably passes through the flared portion, neck region and socket of the connector.

In some forms, the passage in the flared portion is preferably divided to provide a left passage and a right passage, each passage providing an entry point for the cord of the roller blind assembly, the left and right passages being at an acute angle to one another.

In some forms, the wand may further include an eyelet housed within the connector where the left and right passages intersect, the cord being configured to extend through the eyelet, wherein the eyelet is made of a smooth material to reduce friction between the cord and the eyelet as the cord moves during operation of the roller blind assembly.

In some forms, the neck region of the connector is preferably positioned between the socket and the flared portion, the neck region being preferably made of a flexible material. The neck region may be tubular in shape and narrower than the socket and flared portion.

In some forms, the at least in part overlapping of the sleeve assembly with the stalk may be provided by at least part of the sleeve assembly being disposed within the stalk.

In some forms, the stalk can include a proximal end which abuts with a distal end of the socket when the cord is secured to the stalk and the cord is in a retracted position.

In some forms, the stalk can include a cord fastening clip housed at a distal end of the stalk, the cord fastening clip being configured to secure a knot provided towards an end region of the cord.

In some forms, the cord fastening clip may include a peripheral edge which abuts with a distal end of the sleeve assembly when the cord is in a retracted position.

In some forms, the main body of the sleeve assembly may be exposed when the stalk is pulled to operate the roller blind assembly.

According to another aspect of the present disclosure, there is provided a roller blind assembly including a wand in accordance with the first aspect of the present disclosure described above.

In accordance with another aspect of the present disclosure, there is provided a blind assembly including a wand in accordance with the first aspect of the present disclosure described above, wherein the roller blind assembly includes a pulley configured for the operating cord to be wound around, the pulley being rotatable in a first direction when the stalk is pulled downwardly a first predetermined distance to extend the retractable screen, and when the stalk is pulled downwardly a second predetermined distance to retract the screen.

In accordance with another aspect of the present disclosure, there is provided a wand for operating a cord driven roller blind assembly having a retractable screen, the wand comprising: an operating stalk extending along a longitudinal axis of the stalk, the stalk being securable to an operating cord extendable from a control mechanism of the roller blind assembly, the stalk being configured to be pulled downwardly a first predetermined distance by a user to extend the retractable screen and pulled downwardly a second predetermined distance to retract the retractable screen, and a sleeve assembly at least in part overlapping with the stalk, the sleeve assembly comprising a connector for connecting the wand to the control mechanism of the roller blind assembly, the connector comprising a flexible neck region to allow the wand to pivot relative to the control mechanism from a substantially upright position, the sleeve assembly having a passage therethrough configured for passage of the operating cord from the control mechanism to the stalk, wherein the sleeve assembly conceals the cord between the control mechanism and the stalk when the stalk is pulled to operate the blind.

BRIEF DESCRIPTION OF DRAWINGS

Various embodiments/aspects of the disclosure will now be described with reference to the following figures.

DETAILED DESCRIPTION

Figure 3:
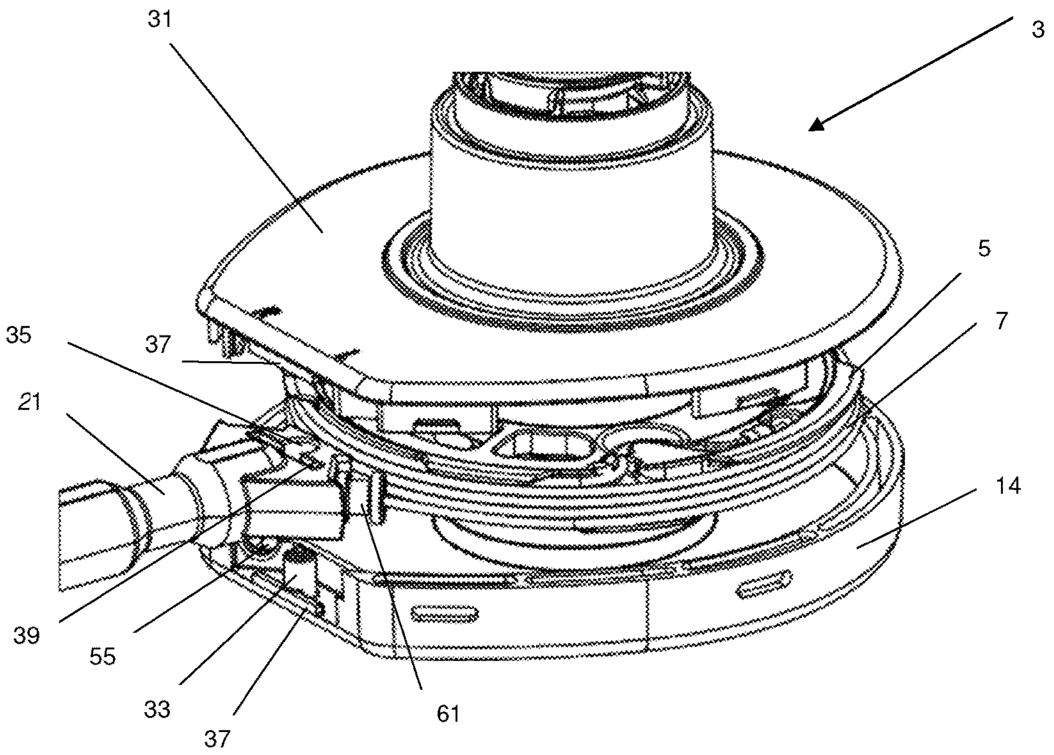
FIG. 3 is an exploded view of the connection of the wand to the clutch assembly illustrated in FIG. 2.
Figure 4:
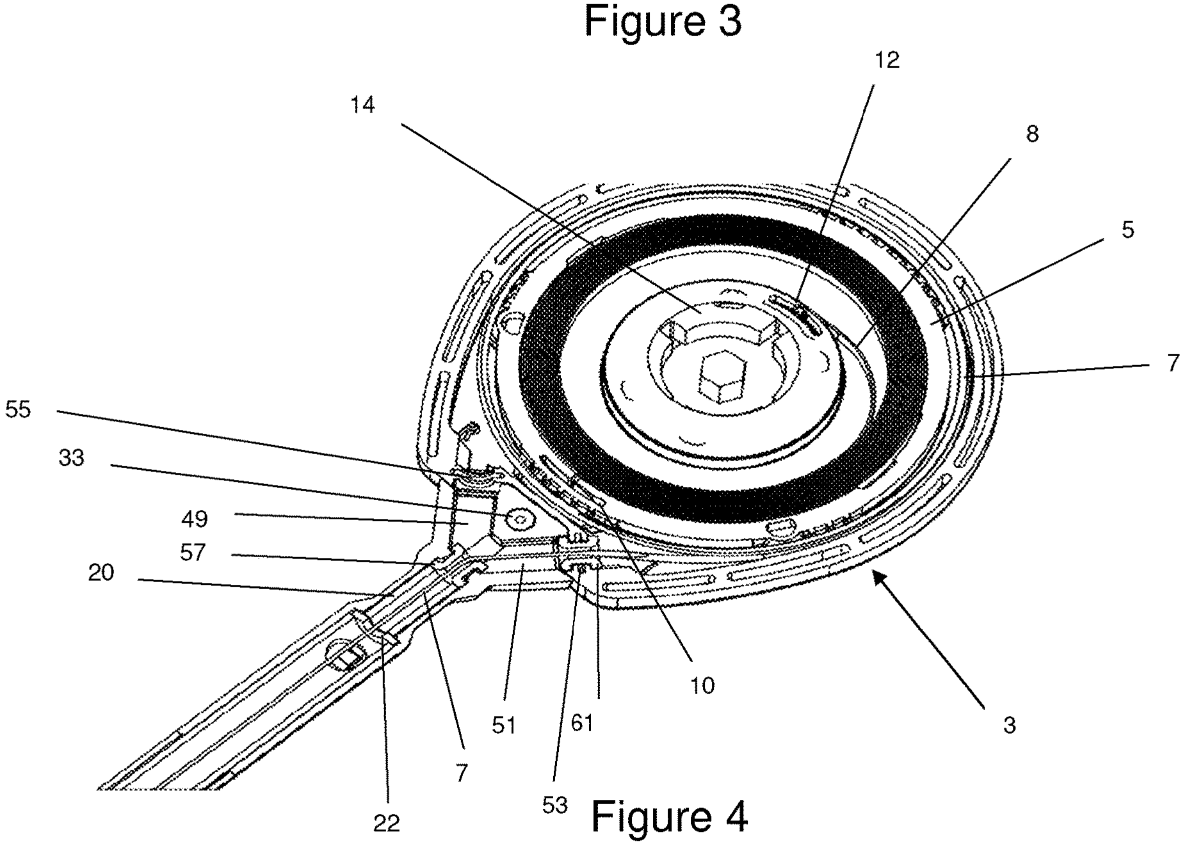
FIG. 4 is a cross-sectional view of the connection of the wand to the clutch assembly illustrated in FIG. 2.

Disclosed herein is a wand 1 for operating a cord driven roller blind assembly 2. The wand 1 will be described with reference to FIGS. 1A to 7. The roller blind assembly 2 includes an elongate tube 4 for supporting a retractable screen 6 (e.g. a length of fabric). A drive mechanism, otherwise referred to as a drive means (not shown), is typically housed within the tube 4 and is configured to rotate the tube 4 about a longitudinal axis of the tube 4 to extend and retract the blind 6 in use. The roller blind assembly 2 may also include a control mechanism which is preferably in the form of a clutch assembly 3 which is operatively connected to the drive means. The clutch assembly 3 is preferably disposed within an end of the elongate tube 4 about which the retractable screen 6 is wound. As illustrated in FIGS. 3 and 4, the clutch assembly 3 preferably includes a pulley 5 about which an operating cord 7, for example a rope or a string, is configured to be wound. The clutch assembly 3 may further include a spring 8 having a first end 10 engaging the pulley 5 and a second (stationary) end 12 that engages a rear housing part 14 of the clutch assembly 3. The spring 8 and pulley 5 are arranged to pull the cord 7 towards the clutch assembly 3 whenever it is released (as discussed below). A similar clutch assembly, along with other components of the roller blind assembly, is described in more detail in International Patent Publication No. WO 2017/197152, the contents of which are incorporated herein by reference.

Figure 7:
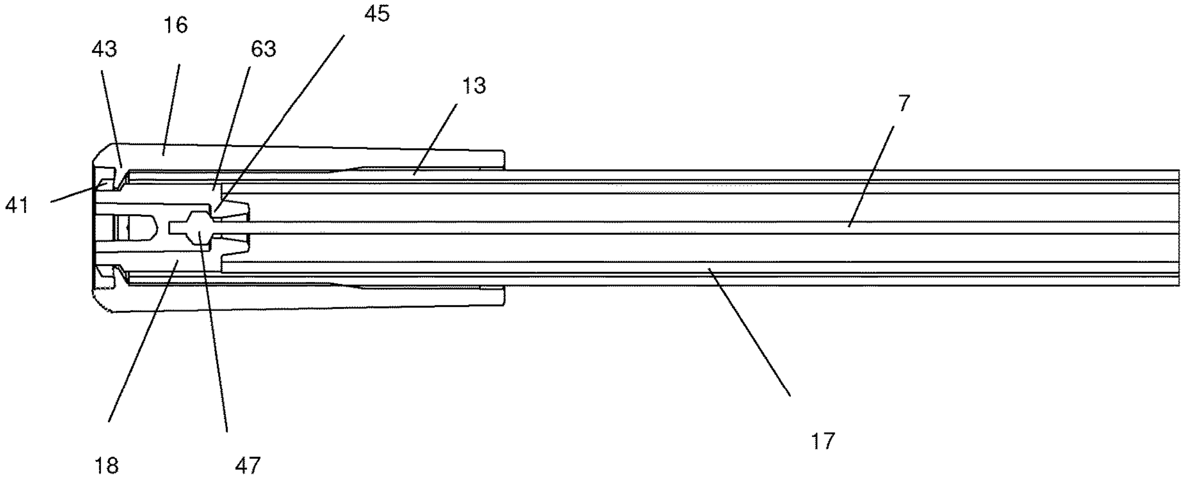
FIG. 7 is a cross-sectional view through the end of the wand of FIG. 1A illustrating the cord fastened to the cord fastening clip.

The wand 1 in accordance with an embodiment of the invention includes an operating stalk 13 secured to the cord 7 to selectively extend and retract the retractable screen by a user pulling on the stalk 13. As best illustrated in FIG. 7, the operating stalk 13 includes an aesthetic cap or hand grip 16 at a distal end of the stalk 13 and a cord fastening clip 18 which includes a one or more resilient legs 41 which abut behind an annular rim 43 of the hand grip 16. The cord fastening clip 18 includes a centrally located aperture having a peripheral rim 45. The cord 7 passes through the centrally located aperture with a knot 47 or other means being provided towards an end of the cord 7. As the cord 7 is pretensioned, the knot 47 is forced into abutment with the peripheral rim 45 to hold the cord 7 in place with the fastening clip 18 at the end of the stalk 13.

Figure 1A:
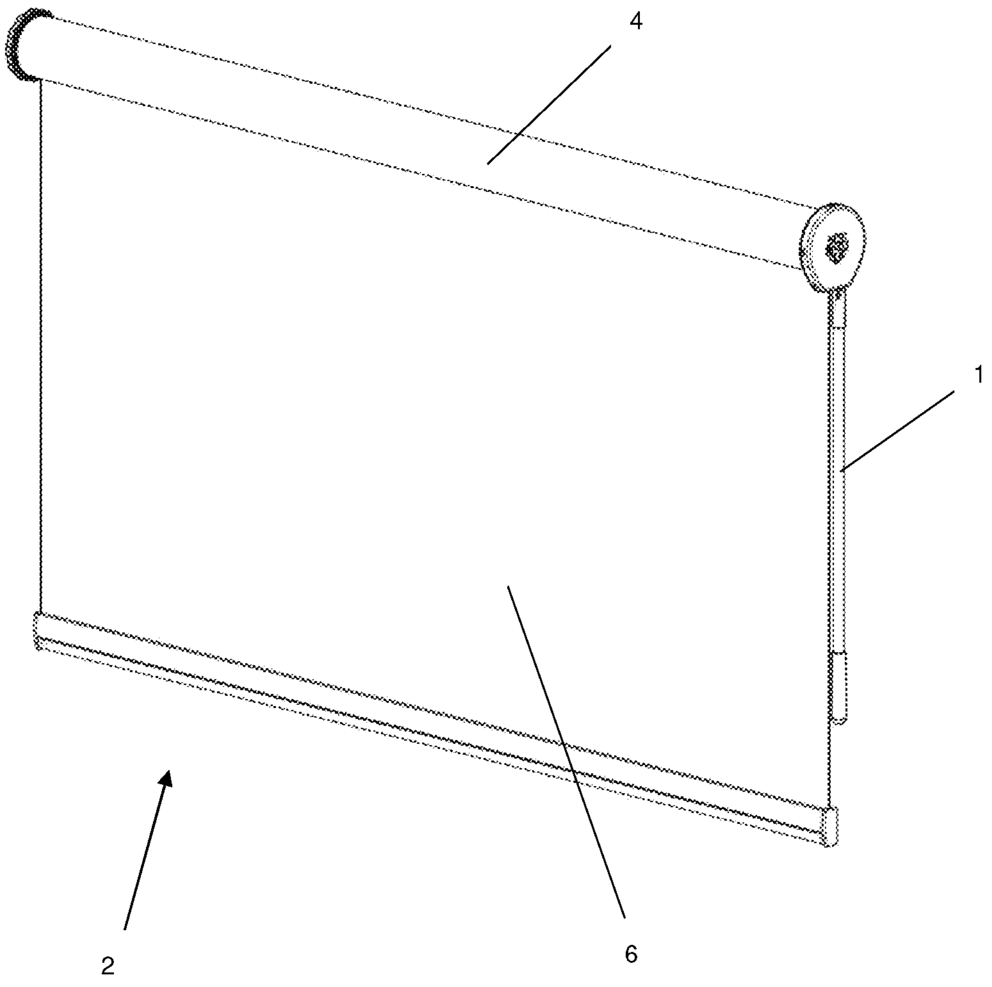
FIG. 1A is a perspective view of a roller blind assembly including a retractable screen operated via a clutch assembly attached to a wand, in accordance with an embodiment of the invention.
Figure 1B:
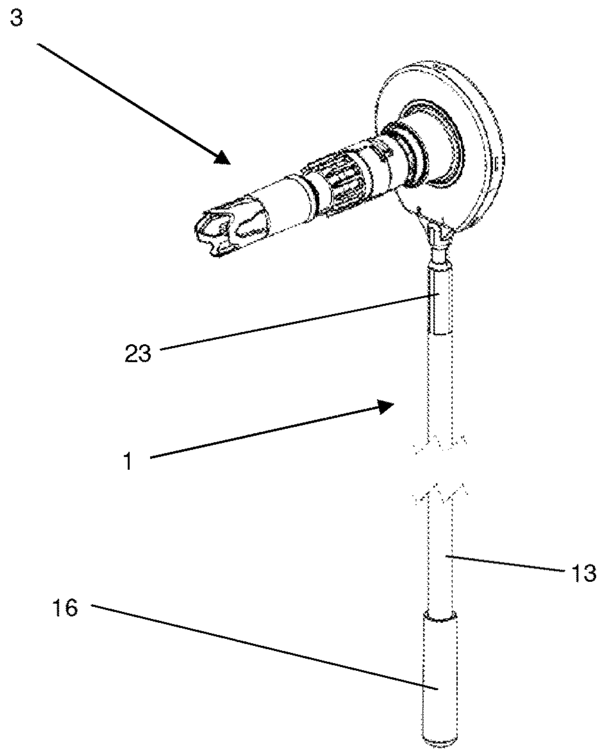
FIG. 1B is a perspective view of the wand in FIG. 1A attached to the clutch assembly of the roller blind, with the wand in a retracted position.
Figure 1C:
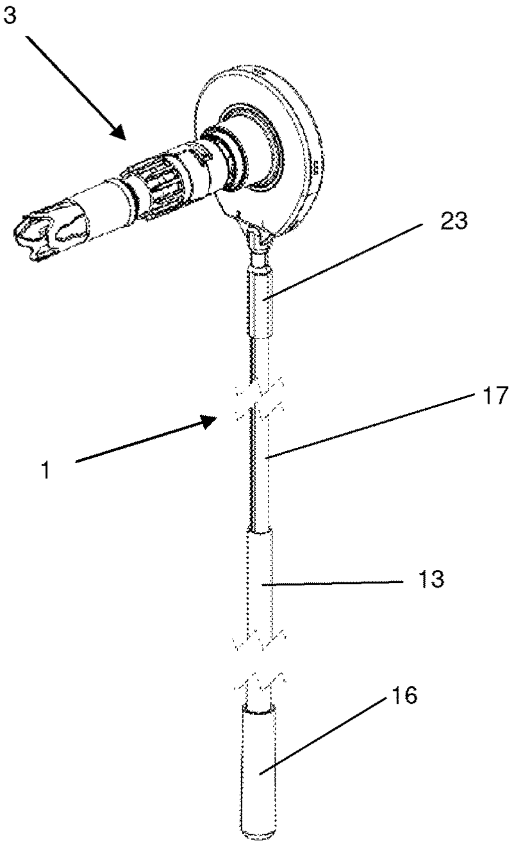
FIG. 1C is a perspective view of the wand and clutch assembly illustrated in FIG. 1B with the wand in an extended position.
Figure 2:
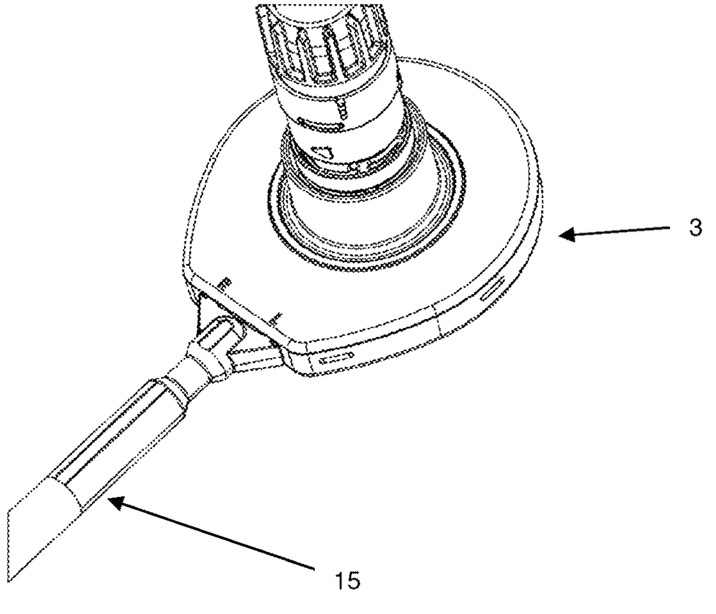
FIG. 2 is a detailed perspective view of the connection of the wand illustrated in FIG. 1A to the clutch assembly.
Figure 5:
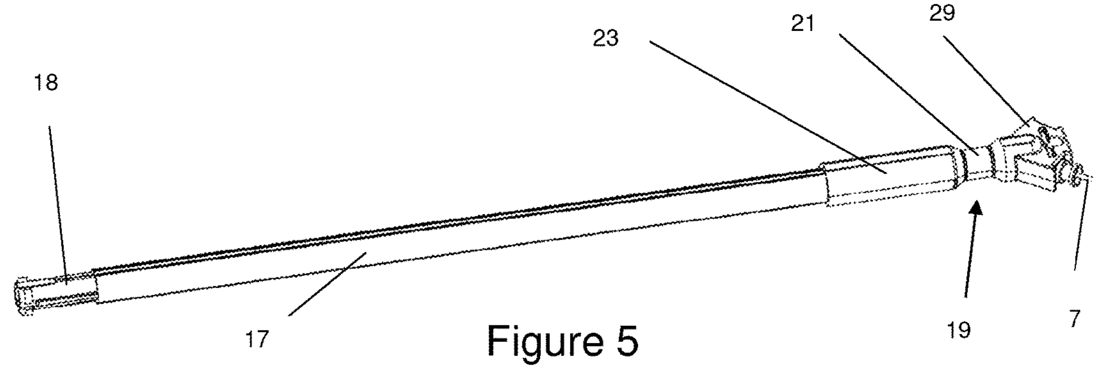
FIG. 5 is a perspective view of the sleeve assembly, cord fastening clip and cord of the wand illustrated in FIG. 1A.

The wand 1 further includes a sleeve assembly 15 having a tubular main body 17, as shown in FIG. 5 which is configured to be preferably disposed within the stalk 13. As best illustrated in FIGS. 4 and 7, the sleeve assembly 15 has an internal passage extending therethrough for passage of the cord 7 from the pulley 5 of the clutch assembly 3 to the operating stalk 13. The tubular main body 17 functions to conceal the cord 7 during operation, irrespective of whether the stalk 13 is in a retracted position, as illustrated in FIGS. 1A and 1B, or a fully extended position, as illustrated in FIG. 1C. When the stalk 13 is in the retracted position, an outer peripheral edge 63 of the cord fastening clip 18 abuts with a distal end of the tubular main body 17 of the sleeve assembly 15, as illustrated in FIG. 7.

Figure 6:
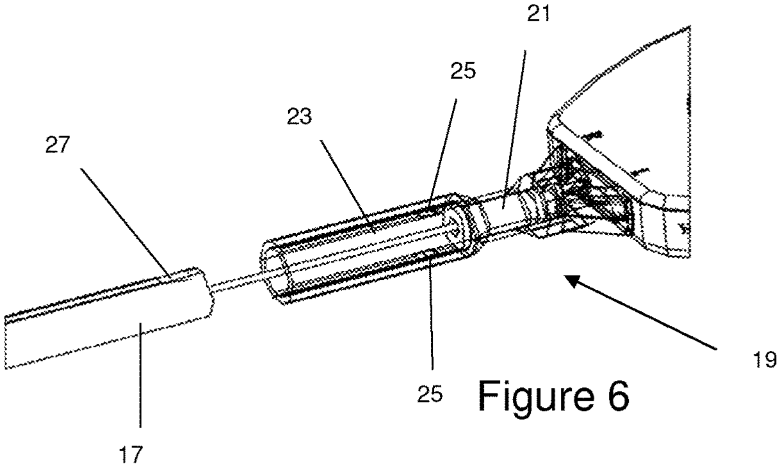
FIG. 6 is a perspective view illustrating the path of the cord through the connector of the sleeve assembly.

As is shown in FIGS. 6 and 7, the sleeve assembly 15 also includes a connector 19 for connecting the wand 1 to the clutch assembly 3. The connector 19 includes a flexible neck region 21 to allow the wand 3 to bend about the neck region 21 in all directions up to around 45° from a substantially upright position and remain operational. In this respect, the connector 19 or at least the neck region 21 of the connector 19 may be made of an elastic polymer material. For example, a thermoplastic elastomer such as a thermoplastic polyurethane (TPU), Desmopan® 385SX, a similar flexible material or rubber. As will be evident to the skilled addressee, alternate materials could be used that provide the same functionality. In a further embodiment not illustrated, the flexible neck region 21 may be in the form of a coil spring.

The connector 19 further includes a socket 23 at a first end for attaching the connector 19 to a proximal end of the main body 17. As illustrated in FIGS. 4 and 6, the socket 23 includes a projection 25 on opposing internal sides of the socket 23 which engages with a respective aperture 27 on opposing sides of the main body 17 to secure the main body 17 to the connector 19. The connector 19 further includes a flared portion 29 at a second end of the connector 19 for attaching the sleeve assembly 15 to the clutch assembly 3. In this regard, at least part of the flared portion 29 is held between the rear housing part 14 of the clutch assembly 3 and a front housing part 31 of the clutch assembly 3 with a protruding boss 33 on the rear housing part 14 being configured to locate through a corresponding hole 35 in the flared portion 29, as best illustrated in FIGS. 3 and 4. One or more longitudinal ribs 37 may also be provided on the front and rear housing parts 31, 14 to engage with one or more corresponding recesses 39 on either side of the flared portion 29 to securely fasten the connector 19 to the clutch assembly 3.

As best illustrated in FIG. 4, the internal passage in the sleeve assembly 15 for the cord 7 passes through the flared portion 29, the neck region 21 and the socket 23 of the connector. The passage through the flared portion 29 is divided into a left passage 51 and a right passage 49 to cater for both right-handed and left-handed operation of the roller blind assembly. The cord 7 in FIG. 4 extends through the left passage 51 which aligns with a left-side hole 53 formed at the intersection of the front housing part 31 with the rear housing part 14. The right passage 49 aligns with a right-side hole 55 also formed at the intersection of the front housing part 31 with the rear housing part 14, however this passage is vacant as the cord 7 and clutch assembly 3 illustrated in FIG. 4 is set for left-handed operation. The left and right passages 51, 49 are at an acute angle to one another to align with the direction of the cord 7 as it leaves the pulley 5. An eyelet 57 is housed within the connector 19 where the left and right passages 51, 49 intersect. In the detailed embodiment, the cord 7 extends through the eyelet 57 in order to prevent the cord 7 jamming and prolong the life of the cord 7 by preventing the cord 7 from being damaged (e.g., frayed, cut, etc.). The eyelet 57 is preferably made of a long-lasting, low friction material such as ceramic or a similar material. Similarly, a second eyelet 61 may be positioned in the left-side hole 53 and right-side hole 55 to provide a smooth path for the cord 7 from the clutch assembly 3 to the connector 19 when configured for left-handed operation and right-handed operation, respectively. A flexible protective tube 20 may also be provided within the neck region 21 to prevent wear on the flexible neck 21 by direct contact with the cord 7, particularly when the wand 1 is bent about the neck region 21 during operation of the wand 1 at an acute angle relative to a freely hanging vertical position of the wand 1. A retaining washer 22 may also be provided directly below the protective tube 20. The retaining washer 22 functions to hold the protective tube 20 in place.

As the stalk 13 is pulled down from a retracted position, in which a proximal end of the stalk 13 abuts with a distal end of the socket 23 (shown in FIG. 1B), to an extended (full stroke) position, in which the main body 17 of the sleeve assembly 15 is exposed (shown in FIG. 1C), the pulley 5 is turned by the cord 7 and the clutch assembly 3 is engaged. As the rear housing part 14 is stationary, as the pulley 5 is rotated in a first direction by cord 7, it winds the spring 8 as the cord 7 is pulled down. Once the downward force on the stalk 13 is removed, the clutch assembly 3 is disengaged and the wound spring 8 rotates the pulley 5 in the opposite second direction thereby pulling the cord 7 up and winding it on the pulley 5 until the proximal end of stalk 13 again comes into contact with the distal end of the socket 23, which acts as a stop. Because the cord 7 is relatively short, preferably the operator can pull on the stalk 13 repeatedly until the retractable screen 6 is lowered to the desired position. Each time a downward force on the stalk 13 is released, components associated with the clutch assembly 3 which are housed within the tube 4, automatically lock the tube 4 and screen 6 in place. To raise the retractable screen 6 from an extended position, the stalk 13 can be pulled downwardly slightly and then released, causing the cord 7 and the clutch assembly 3 to release the retractable screen 6.

The word ‘comprising’ and forms of the word ‘comprising’ as used in this description and in the claims does not limit the invention claimed to exclude any variants or additions.

Modifications and improvements to the invention will be readily apparent to those skilled in the art. Such modifications and improvements are intended to be within the scope of this invention.

What is claimed is:

1. A wand for operating a cord driven roller blind assembly having a retractable screen, the wand comprising:
- an operating stalk extending along a longitudinal axis of the stalk, the stalk being securable to an operating cord extendable from a control mechanism of the roller blind assembly, the stalk being configured to be pulled downwardly a first predetermined distance by a user to extend the retractable screen and pulled downwardly a second predetermined distance to retract the retractable screen; and
- a sleeve assembly at least in part overlapping with the stalk, the sleeve assembly comprising:
  - a connector for connecting the wand to the control mechanism of the roller blind assembly, the connector comprising:
    - a socket portion at a first end of the connector;
    - a flared portion at a second end of the connector, the flared portion being configured to be mounted within a housing of the control mechanism;
    - a flexible neck region disposed between the socket portion and the flared portion, the flexible neck region being configured to allow the wand to pivot relative to the control mechanism from a substantially upright position, the flexible neck region being narrower than both the socket portion and the flared portion;
  - an elongate main body having a proximal end configured to be received within the socket portion and a distal end configured to be disposed within the stalk, the sleeve assembly having a passage therethrough configured for passage of the operating cord from the control mechanism through the flared portion, the flexible neck region, and the socket portion to the stalk;
  - the sleeve assembly concealing the operating cord between the control mechanism and the stalk when the stalk is pulled to operate the blind.

2. The wand according to claim 1, wherein the passage for the cord is divided within the flared portion to provide a left passage and a right passage, each passage providing an entry point for the cord, the left and right passages being at an acute angle to one another, the left passage being aligned with a left-side hole defined by the housing of the control mechanism and the right passage being aligned with a right-side hole defined by the housing of the control mechanism.

3. The wand according to claim 1, wherein the flexible neck region of the connector is made of an elastic polymer material.

4. The wand according to claim 3, further comprising an eyelet housed within the connector where the left and right passages intersect, the cord being configured to extend through the eyelet, the eyelet being made of a low-friction material to reduce friction between the cord and the eyelet during operation of the roller blind assembly.

5. The wand according to claim 1, wherein when the stalk is in a retracted position, a proximal end of the stalk abuts with a distal end of the socket portion to define a retracted stop position of the stalk.

6. The wand according to claim 5, wherein the stalk comprises a hand grip at a distal end of the stalk and a cord fastening clip housed at a within the distal end of the stalk, the cord fastening clip comprising one or more resilient legs configured to about behind an annular rim of the hand grip to retain the cord fastening clip within the stalk, and a centrally located aperture having a peripheral rim through which the operating cord passes, a knot provided towards an end region of the cord being forced into abutment with the peripheral rim under pretension of the cord.

7. The wand according to claim 6, wherein an outer peripheral edge of the cord fastening clip abuts with a distal end of the elongate main body of the sleeve assembly when the stalk is in the retracted position.

8. The wand according to claim 1, wherein at least part of the flared portion is held between a rear housing part and a front housing part of the control mechanism, a protruding boss on the rear housing part being configured to locate through a corresponding hole in the flared portion to locate the connector within the housing of the control mechanism.

9. The wand according to claim 8, wherein one or more longitudinal ribs on the front housing part and the rear housing part engage with one or more corresponding recesses on either side of the flared portion to securely fasten the connector to the control mechanism.

10. The wand according to claim 1, wherein the socket portion comprises a projection on opposing internal sides thereof, each projection being configured to engage with a respective aperture on opposing sides of the elongate main body to secure the elongate main body to the connector.

11. The wand according to claim 10, wherein the elongate main body of the sleeve assembly is exposed when the stalk is pulled to operate the roller blind assembly.

12. The wand according to claim 11, wherein the control mechanism further comprises a pulley about which the operating cord is wound and a spring having a first end engaging the pulley and a second end engaging a rear housing part of the control mechanism, the spring and pulley being configured to pull the operating cord towards the control mechanism upon release of the stalk.

* * * * *